United States Patent
Ban et al.

(10) Patent No.: US 7,359,817 B2
(45) Date of Patent: Apr. 15, 2008

(54) METHOD OF AND DEVICE FOR RE-CALIBRATING THREE-DIMENSIONAL VISUAL SENSOR IN ROBOT SYSTEM

(75) Inventors: Kazunori Ban, Yamanashi (JP); Ichiro Kanno, Yokohama (JP)

(73) Assignee: Fanuc Ltd, Yamanashi (JP)

( * ) Notice: Subject to any disclaimer, the term of this patent is extended or adjusted under 35 U.S.C. 154(b) by 133 days.

(21) Appl. No.: 11/190,946

(22) Filed: Jul. 28, 2005

(65) Prior Publication Data

US 2006/0023938 A1 Feb. 2, 2006

(30) Foreign Application Priority Data

Jul. 28, 2004 (JP) .............................. 2004-220251

(51) Int. Cl.
G06F 19/00 (2006.01)
G01C 25/00 (2006.01)
G05B 99/00 (2006.01)
(52) U.S. Cl. .................... 702/94; 73/1.75; 73/1.79; 73/1.81; 356/2; 356/3; 356/4.01; 382/100; 382/108; 700/245; 700/254; 700/258; 700/259; 702/85; 702/95; 702/97; 702/105; 702/150; 702/152; 702/155
(58) Field of Classification Search ................ 73/1.75, 73/1.79, 1.81; 356/2, 3, 4.01, 4.02, 4.03, 356/9, 15, 16, 17, 18; 382/100, 106, 108; 700/90, 245, 250, 251, 254, 258, 259; 702/1, 702/85, 86, 90, 94, 95, 97, 105, 127, 150, 702/152, 153, 155, 166, 167
See application file for complete search history.

(56) References Cited

U.S. PATENT DOCUMENTS 2,896,501 A * 7/1959 Stamps ....................... 356/2

2,964,644 A * 12/1960 Hobrough ...................... 250/558

(Continued)

FOREIGN PATENT DOCUMENTS

DE 10 2004 046 584 A1 * 5/2005

(Continued)

OTHER PUBLICATIONS

Japanese Patent Office Notice of Reasons for Rejection, dated Oct. 24, 2006, and issued in priority Japanese Patent Application No. 2004-220251.

(Continued)

Primary Examiner—Edward R Cosimano
(74) Attorney, Agent, or Firm—Staas & Halsey LLP

(57) ABSTRACT

A re-calibration method and device for a three-dimensional visual sensor of a robot system, whereby the work load required for re-calibration is mitigated. While the visual sensor is normal, the visual sensor and a measurement target are arranged in one or more relative positional relations by a robot, and the target is measured to acquire position/orientation information of a dot pattern etc. by using calibration parameters then held. During re-calibration, each relative positional relation is approximately reproduced, and the target is again measured to acquire feature amount information or position/orientation of the dot pattern etc. on the image. Based on the feature amount data and the position information, the parameters relating to calibration of the visual sensor are updated. At least one of the visual sensor and the target, which are brought into the relative positional relation, is mounted on the robot arm. During the re-calibration, position information may be calculated using the held calibration parameters as well as the feature amount information obtained during normal operation of the visual sensor and that obtained during the re-calibration, and the calibration parameters may be updated based on the calculation results.

12 Claims, 10 Drawing Sheets

U.S. PATENT DOCUMENTS

| | | | | |
|---|---|---|---|---|
| 3,078,042 | A | * | 2/1963 | Grado .................. 708/811 |
| 5,671,056 | A | * | 9/1997 | Sato ..................... 356/602 |
| 5,706,419 | A | * | 1/1998 | Matsugu et al. ........ 345/420 |
| 6,114,824 | A | | 9/2000 | Watanabe |
| 6,321,137 | B1 | | 11/2001 | De Smet |
| 6,798,527 | B2 | * | 9/2004 | Fukumoto et al. ...... 356/602 |
| 7,209,161 | B2 | * | 4/2007 | Thal et al. ............. 348/42 |
| 2003/0187548 | A1 | * | 10/2003 | Sakhitab et al. ........ 700/259 |
| 2006/0023938 | A1 | * | 2/2006 | Ban et al. .............. 382/153 |
| 2007/0009149 | A1 | * | 1/2007 | Wagner et al. .......... 382/154 |

FOREIGN PATENT DOCUMENTS

| | | | |
|---|---|---|---|
| EP | 1 555 508 | | 7/2005 |
| JP | 2-183102 | | 7/1990 |
| JP | 04-75887 A | * | 3/1992 |
| JP | 5-16083 | | 1/1993 |
| JP | 8-5351 | | 1/1996 |
| JP | 8-233516 | | 9/1996 |
| JP | 8-272414 | | 10/1996 |
| JP | 2686351 | | 8/1997 |
| JP | 2690603 | | 8/1997 |
| JP | 10-336701 | | 12/1998 |
| JP | 2004-193947 | | 7/2004 |
| JP | 2005-172610 A | * | 6/2005 |
| WO | WO 2005/031647 A1 | * | 4/2005 |

OTHER PUBLICATIONS

Chen, C.H., Kak, A.C., Institute of Electrical and Electronics Engineers: "Modeling and Calibration of a Structured Light Scanner for 3-D Robot Vision", Proceedings of the International Conference on Robotics and Automation; Raleigh, Mar. 30-Apr. 3, 1987, Washington, IEEE Comp. Soc. Press, US, vol. 2, Mar. 3, 1987, pp. 807-815, XP002079443.

European Search Report dated Nov. 28, 2005 for related European Patent Application No. 05254725.4.

* cited by examiner

METHOD OF AND DEVICE FOR RE-CALIBRATING THREE-DIMENSIONAL VISUAL SENSOR IN ROBOT SYSTEM

BACKGROUND OF THE INVENTION

1. Field of the Invention

The present invention generally relates to an industrial robot system including a three-dimensional visual sensor, and more particularly to a method of re-calibrating a three-dimensional visual sensor and a device for carrying out the re-calibration method.

2. Description of Related Art

Three-dimensional visual sensors are widely used in various applications employing robot systems. Usage of three-dimensional visual sensors can be classified roughly into the following two cases (i) and (ii).

(i) A three-dimensional visual sensor is used with its sensor head mounted on a robot arm. The sensor head denotes a sensor section having an optical system (including an optical detector) for measuring an object, and control of the sensor head and processing of the detection signal are performed by a visual sensor controller. In this specification, the expression "mounting a three-dimensional visual sensor on a robot arm" is sometimes used in the sense of "mounting the sensor head of a three-dimensional visual sensor on a robot arm" in accordance with the practice of the technical field concerned.

(ii) A three-dimensional visual sensor is used with its sensor head set in a fixed position external to a robot.

In either case, it is well known that "calibration" is needed in order to perform measurement with proper accuracy by using a three-dimensional visual sensor. Calibration methods for three-dimensional visual sensors are described in detail in, for example, JP2690603B and JP2686351B and JP 08-5351A, JP08-233516A and JP08-272414A.

Thus, various calibration methods for three-dimensional visual sensors are conventionally known, but it is often the case that after proper measurement accuracy is once obtained by calibration, the measurement accuracy lowers, making accurate measurement impossible. Such a situation arises, in the aforementioned case (i), when the mounting position (including the orientation, as is the case with the following description) of the visual sensor (sensor head) mounted on the robot arm is displaced from the position where the calibration was performed. In the above case (ii), the same situation occurs when the set position of the visual sensor (sensor head) is displaced from the fixed position where the calibration was performed.

Such displacement of the sensor is caused, for example, when the visual sensor mounted on the robot arm collides against an object (including a person, as is the case with the following description) around the sensor, when the visual sensor is applied with an impact as a result of the collision of the robot arm against an object around the robot arm, or when an object collides with the sensor set in the fixed position. Also, even if the apparent position of the sensor is not displaced, the arrangement of the internal optical system may possibly change from that at the time of calibration due to an impact or the like, causing lowering of the measurement accuracy.

Conventionally, when such a situation occurs or is presumed to have occurred, identical calibration work is performed all over again. To again perform the identical calibration work, however, it is necessary that the relative positional relation between a measurement target and the visual sensor should be accurately reproduced by again using a calibration jig, requiring a heavy work load and inevitably prolonging the system downtime. The "measurement target" referred to in this specification denotes a target to be recognized by the visual sensor for the purpose of calibration, and a group of dots drawn on the calibration jig, for example, is used as the measurement target.

SUMMARY OF THE INVENTION

According to the present invention, data obtained while a three-dimensional visual sensor is capable of normal measurement is used so that re-calibration can be performed easily without the need to repeat calibration work all over again, thereby mitigating the work load required for the re-calibration.

In accordance with the present invention, while the three-dimensional visual sensor is in a state (first state) capable of normal measurement, the three-dimensional visual sensor and a measurement target are arranged in at least one optional relative positional relation, and then the measurement target is measured by the three-dimensional visual sensor to acquire predetermined "reference data". The "reference data" may be either of the following two (I) and (II).

(I) Position/orientation data (data indicative of at least one of position and orientation of the measurement target) obtained using parameters relating to calibration then held by the three-dimensional visual sensor.

(II) Feature amount data on the measurement target.

The "optional relative positional relation" may be two or more in number, and in this case, the position data is acquired and stored with respect to each of the relative positional relations.

If, after the above preparatory process, the three-dimensional visual sensor needs to be recalibrated (second state) due to interference of a robot, for example, the relative positional relation between the three-dimensional visual sensor and the measurement target is reproduced at least approximately so as to be almost identical to that with which the predetermined data was obtained. Then, the measurement target is again measured to detect feature amount data on the measurement target. Using the data obtained by the remeasurement and the reference data already acquired, re-calibration is performed.

The present invention provides a re-calibration method for a three-dimensional visual sensor of a robot system, the three-dimensional visual sensor holding a plurality of parameters relating to calibration.

According to one aspect of the present invention, the re-calibration method comprises the steps of:

(a) arranging the three-dimensional visual sensor and a measurement target in at least one optional relative positional relation while the three-dimensional visual sensor is in a state capable of normal measurement, then measuring the measurement target by the three-dimensional visual sensor to acquire position/orientation data indicative of at least one of position and orientation of the measurement target by using the parameters relating to calibration then held by the three-dimensional visual sensor, and storing the position/orientation data;

(b) arranging the three-dimensional visual sensor and the measurement target so as to reproduce the at least one relative positional relation at least approximately when the three-dimensional visual sensor is to be recalibrated after the three-dimensional visual sensor was in the aforesaid state, and then measuring the measurement target by the three-dimensional visual sensor to acquire feature amount data on the measurement target; and (c) updating the parameters relating to calibration of the three-dimensional visual sensor, based on the feature amount data and the position/orientation data, wherein arranging the three-dimensional visual sensor and the measurement target in the at least one relative positional relation, in the aforesaid step (a), and arranging the three-dimensional visual sensor and the measurement target so as to reproduce the at least one relative positional relation at least approximately, in the aforesaid step (b), are carried out by moving a robot which supports at least one of the three-dimensional visual sensor and the measurement target, and in the aforesaid step (b), the robot is moved to reproduce a robot position where the at least one relative positional relation was established in the aforesaid step (a), in order to reproduce the at least one relative positional relation at least approximately in the aforesaid step (b).

According to another aspect of the present invention, the re-calibration method comprises the steps of:

(a) arranging the three-dimensional visual sensor and the measurement target in at least one optional relative positional relation while the three-dimensional visual sensor is in a state capable of normal measurement, then measuring the measurement target by the three-dimensional visual sensor to acquire feature amount data on the measurement target, and storing the feature amount data;

(b) arranging the three-dimensional visual sensor and the measurement target so as to reproduce the at least one relative positional relation at least approximately when the three-dimensional visual sensor is to be recalibrated after the three-dimensional visual sensor was in the aforesaid state, and then measuring the measurement target by the three-dimensional visual sensor to acquire feature amount data on the measurement target; and (c) updating the parameters relating to calibration of the three-dimensional visual sensor, based on the parameters relating to calibration of the three-dimensional visual sensor held at the time of the aforesaid step (a), the feature amount data acquired in the aforesaid step (a), and the feature amount data acquired in the aforesaid step (b), wherein arranging the three-dimensional visual sensor and the measurement target in the at least one relative positional relation, in the aforesaid step (a), and arranging the three-dimensional visual sensor and the measurement target so as to reproduce the at least one relative positional relation at least approximately, in the aforesaid step (b), are carried out by moving a robot which supports at least one of the three-dimensional visual sensor and the measurement target, and in the aforesaid step (b), the robot is moved to reproduce a robot position where the at least one relative positional relation was established in the aforesaid step (a), in order to reproduce the at least one relative positional relation at least approximately in the aforesaid step (b).

One of the three-dimensional visual sensor and the measurement target may be mounted on an arm of the robot while the other may be placed at a predetermined position other than the arm of the robot, so as to be arranged in the at least one relative positional relation in the aforesaid step (a), and to reproduce the at least one relative positional relation at least approximately in the aforesaid step (b).

Also, the three-dimensional visual sensor may be mounted on the arm of the robot and the measurement target may be placed at a position different from the arm of the robot, so as to be arranged in the at least one relative positional relation in the aforesaid step (a), and to reproduce the at least one relative positional relation at least approximately in the aforesaid step (b).

Moreover, the three-dimensional visual sensor may be mounted on the arm of the robot and the measurement target may be placed on an arm of a different robot, so as to be arranged in the at least one relative positional relation in the aforesaid step (a), and to reproduce the at least one relative positional relation at least approximately in the aforesaid step (b).

The present invention further provides a device for re-calibrating a three-dimensional visual sensor with a measurement target mounted on a robot.

According to one aspect of the present invention, the re-calibration device comprises:

means for holding a plurality of parameters relating to calibration of the three-dimensional visual sensor;

means for moving the robot to at least one robot position where the three-dimensional visual sensor is located close to the measurement target;

target position information detection means for detecting position information on the measurement target in the at least one robot position, through measurement by the three-dimensional visual sensor;

target feature amount information detection means for detecting feature amount information on the measurement target in the at least one robot position, through measurement by the three-dimensional visual sensor;

means, responsive to a reference data acquisition command, for causing the target position information detection means to detect position information on the measurement target, and storing the detected position information as position/orientation data indicative of at least one of position and orientation of the measurement target by using the held parameters relating to calibration of the three-dimensional visual sensor;

means, responsive to a re-calibration command, for causing the target feature amount information detection means to detect feature amount information on the measurement target, and obtaining the detected feature amount information as feature amount data; and parameter updating means for updating the parameters relating to calibration of the three-dimensional visual sensor, based on the feature amount data and the position/orientation data.

According to another aspect of the invention, the re-calibration device comprises:

means for holding a plurality of parameters relating to calibration of the three-dimensional visual sensor;

means for moving the robot to at least one robot position where the measurement target is located close to the three-dimensional visual sensor;

target position information detection means for detecting position information on the measurement target in the at least one robot position, through measurement by the three-dimensional visual sensor;

target feature amount information detection means for detecting feature amount information on the measurement target in the at least one robot position, through measurement by the three-dimensional visual sensor;

means, responsive to a reference data acquisition command, for causing the target position information detection means to detect position information on the measurement target, and storing the detected position information as position/orientation data indicative of at least one of position and orientation of the measurement target by using the held parameters relating to calibration of the three-dimensional visual sensor;

means, responsive to a re-calibration command, for causing the target feature amount information detection means to detect feature amount information on the measurement target, and obtaining the detected feature amount information as feature amount data; and parameter updating means for updating the parameters relating to calibration of the three-dimensional visual sensor, based on the feature amount data and the position/orientation data.

According to still another aspect of the invention, the re-calibration device comprises:

means for holding a plurality of parameters relating to calibration of the three-dimensional visual sensor;

means for moving the robot to at least one robot position where the three-dimensional visual sensor is located close to the measurement target;

target feature amount information detection means for detecting feature amount information on the measurement target in the at least one robot position, through measurement by the three-dimensional visual sensor;

means, responsive to a reference data acquisition command, for causing the target feature amount information detection means to detect feature amount information on the measurement target, and storing the detected feature amount information as reference feature amount data;

means, responsive to a re-calibration command, for causing the target feature amount information detection means to detect feature amount information on the measurement target, and obtaining the detected feature amount information as feature amount data; and parameter updating means for updating the parameters relating to calibration of the three-dimensional visual sensor, based on the feature amount data, the reference feature amount data, and the parameters relating to calibration of the three-dimensional visual sensor held at the time of reception of the reference data acquisition command.

According to a further aspect of the invention, the re-calibration device comprises:

means for holding a plurality of parameters relating to calibration of the three-dimensional visual sensor;

means for moving the robot to at least one robot position where the measurement target is located close to the three-dimensional visual sensor;

target feature amount information detection means for detecting feature amount information on the measurement target in the at least one robot position, through measurement by the three-dimensional visual sensor;

means, responsive to a reference data acquisition command, for causing the target feature amount information detection means to detect feature amount information on the measurement target, and storing the detected feature amount information as reference feature amount data;

means, responsive to a re-calibration command, for causing the target feature amount information detection means to detect feature amount information on the measurement target, and obtaining the detected feature amount information as feature amount data; and parameter updating means for updating the parameters relating to calibration of the three-dimensional visual sensor, based on the feature amount data, the reference feature amount data, and the parameters relating to calibration of the three-dimensional visual sensor held at the time of reception of the reference data acquisition command.

According to the present invention, the three-dimensional visual sensor can be recalibrated with ease. Specifically, at the time of re-calibration, it is unnecessary to use a calibration jig for accurately reproducing the relative positional relation between the three-dimensional visual sensor and the measurement target, and the re-calibration is achieved using the position data (obtained during normal measurement) and feature amounts (obtained during re-calibration) of the measurement target acquired at the same robot position. Accordingly, the re-calibration does not require the labor and time for attaching and detaching the calibration jig, unlike the conventional techniques, and the three-dimensional visual sensor can be restored to its normal state in a very short time.

DETAILED DESCRIPTION

Figure 1:
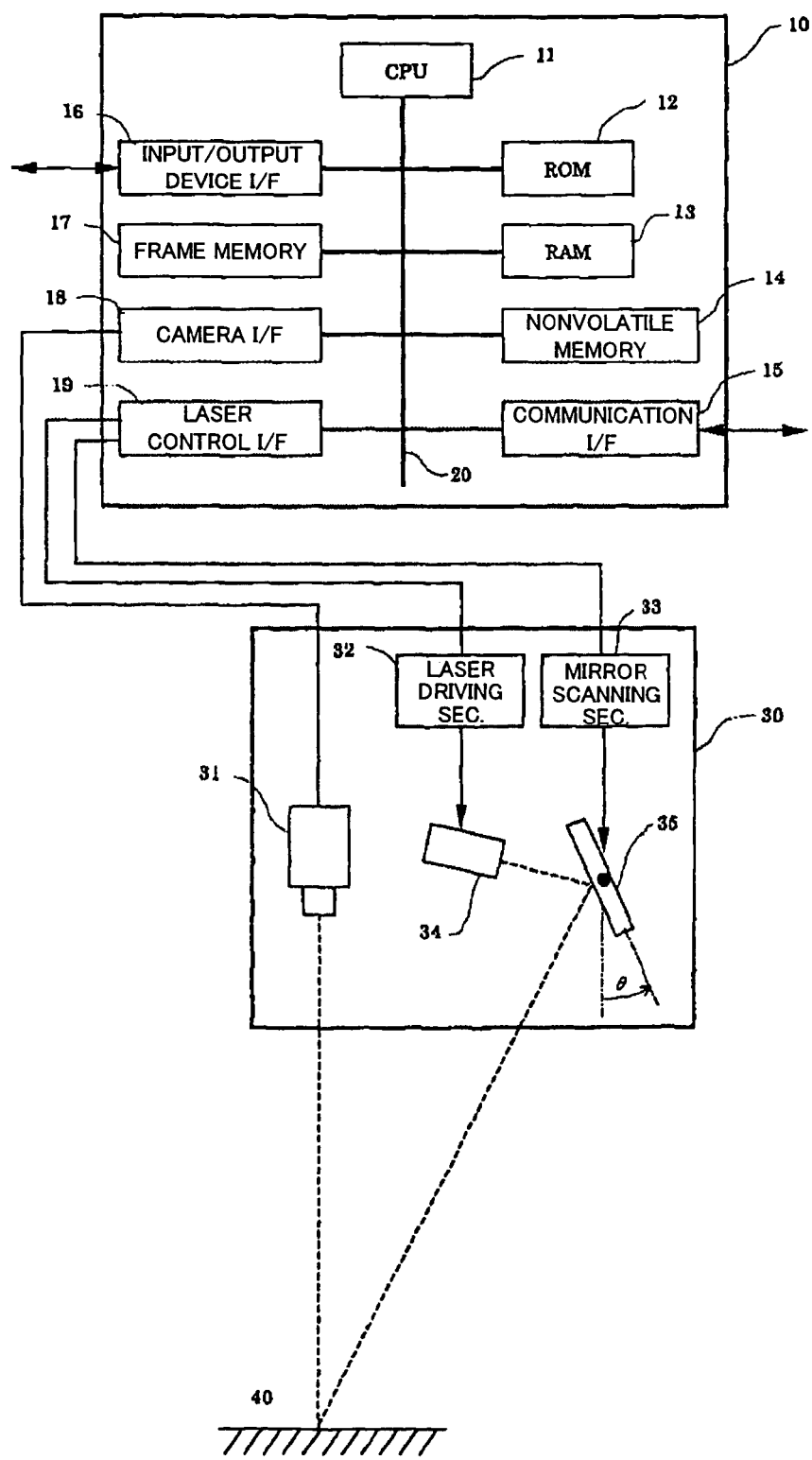
FIG. 1 shows the configuration of a principal part of a three-dimensional visual sensor used in an embodiment of the invention.

FIG. 1 shows the configuration of a principal part of a three-dimensional visual sensor (hereinafter also referred to merely as "visual sensor") used in an embodiment of the invention. The illustrated visual sensor itself is a typical one well known in the art, and comprises a sensor head 30 including an optical system and optical detection means for measuring an object, and a three-dimensional visual sensor controller 10 for controlling the sensor head 30 and processing information related to three-dimensional measurement. In the sensor head 30 are arranged a laser beam emitter 34, a laser driving section 32 for driving the emitter, a mirror 35 for scanning an object with the laser beam, and a mirror scanning section 33 for driving the mirror. The sensor head is also equipped with a camera 31 for acquiring a two-dimensional image of an object 40 and receiving the reflection of the laser beam irradiated onto the object 40.

On the other hand, the three-dimensional visual sensor controller 10 includes a CPU 11, a group of memories such as a ROM 12, a RAM 13, a nonvolatile memory 14 and a frame memory 17, a communication I/F (interface) 15 for exchanging data with a robot controller etc., an input/output device I/F (interface) 16 for exchanging data with external devices such as a monitor, a camera I/F (interface) 18 for driving the camera 31 to acquire images therefrom, a laser control I/F (interface) 19 for exchanging data with the laser driving section 32 and the mirror scanning section 33, and a bus 20 electrically connecting the components of the controller 10.

At the time of three-dimensional measurement, a program stored in the ROM 12 or the like is executed by the CPU 11, whereupon the laser beam is irradiated onto the object 40 via the mirror 35 set at a predetermined angle θ (usually, the mirror is set successively at a plurality of angles), and with respect to each set angle θ, an image of the laser beam is acquired through the camera 31 and stored in the frame memory 17. Then, feature amounts are extracted from the acquired images by image processing, and using the feature amounts and calibration data previously stored in the nonvolatile memory 14 or the like (calibration data then stored), information such as the position and orientation of the object 40 is calculated. In the case of normal imaging of the object 40 by the camera 31, two-dimensional images are stored in the frame memory 17 and subjected to required image processing to extract feature amounts from the images. Also, using the calibration data as needed which is previously stored in the nonvolatile memory 14 or the like, feature amount data etc. are calculated.

The present invention is applied to re-calibration of a three-dimensional visual sensor and thus is naturally premised on the assumption that proper calibration is executed prior to the re-calibration to obtain a plurality of parameters representative of the contents of the calibration (hereinafter also referred to merely as "calibration parameters"). The calibration parameters obtained by the calibration prior to the re-calibration are also necessary for the "acquisition of position data (in this embodiment, dot pattern position data)", described later.

Figure 2:
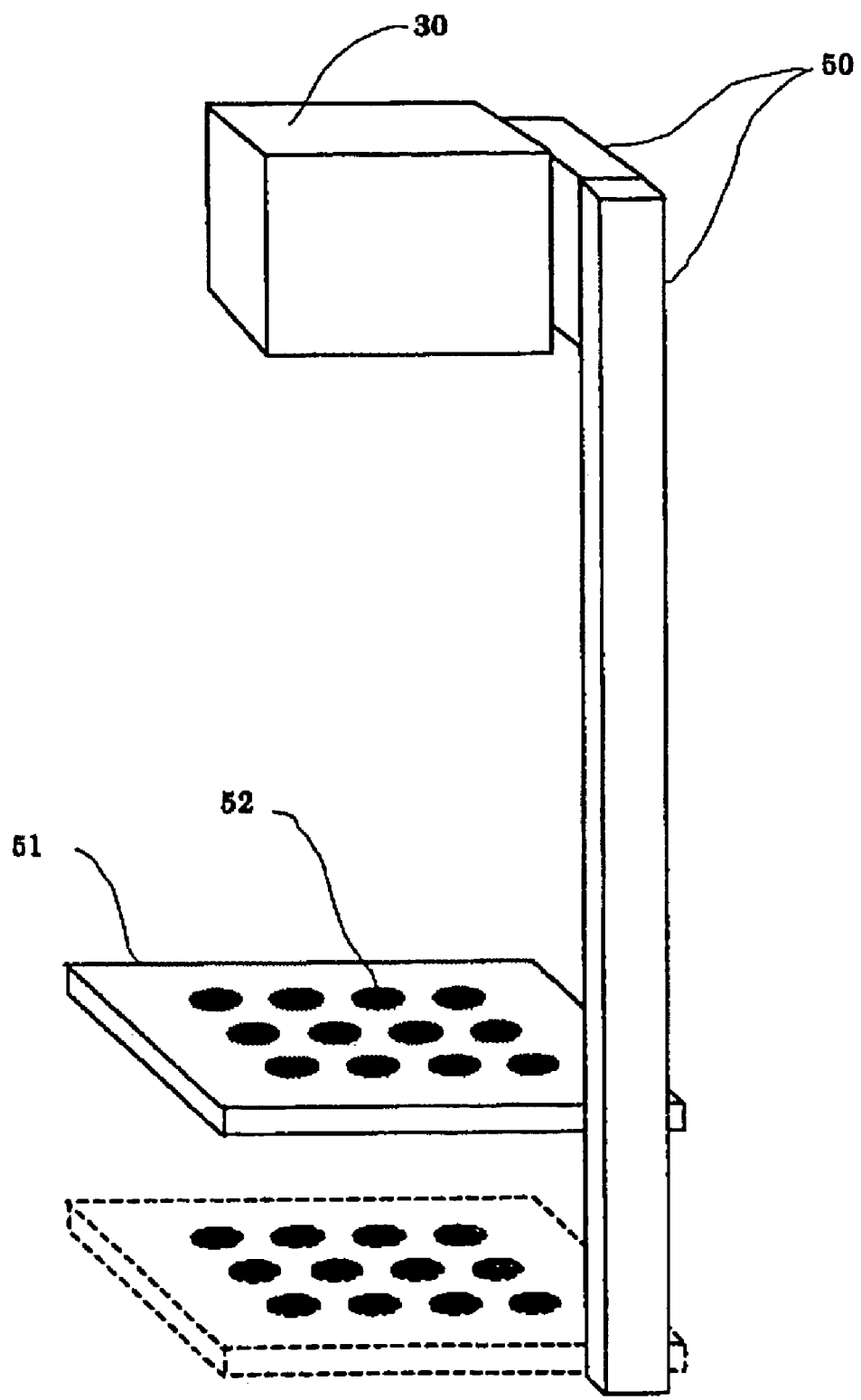
FIG. 2 illustrates a method of calibrating the three-dimensional visual sensor by using a calibration jig.

Referring also to FIG. 2, the "calibration prior to re-calibration" will be explained. In the following description of the present invention, the term "each" is used also to designate an element which can in practice be single in number. To perform the calibration, first, a calibration jig 50 having a measurement target 51 for calibration, as shown in FIG. 2, is attached to the sensor head 30 and the measurement target 51 is set in a predetermined position. The measurement target is set in a single position or is sequentially set in a plurality of positions, depending on the calibration method used. In the illustrated example, the measurement target is sequentially set in two positions. At each of the set positions, predetermined measurement is carried out by using the sensor head 30 and the visual sensor controller 10 in accordance with the calibration method employed, whereby calibration parameters are obtained. In the following, an exemplary calibration method will be explained.

The measurement target 51 has a dot pattern or the like printed thereon, and the calibration jig 50 is configured such that when the measurement target 51 is set in each of the predetermined positions, each dot of the dot pattern 52 is located at a certain known position relative to the sensor head 30. Details of the calibration will be explained with reference to FIG. 3.

Figure 3:
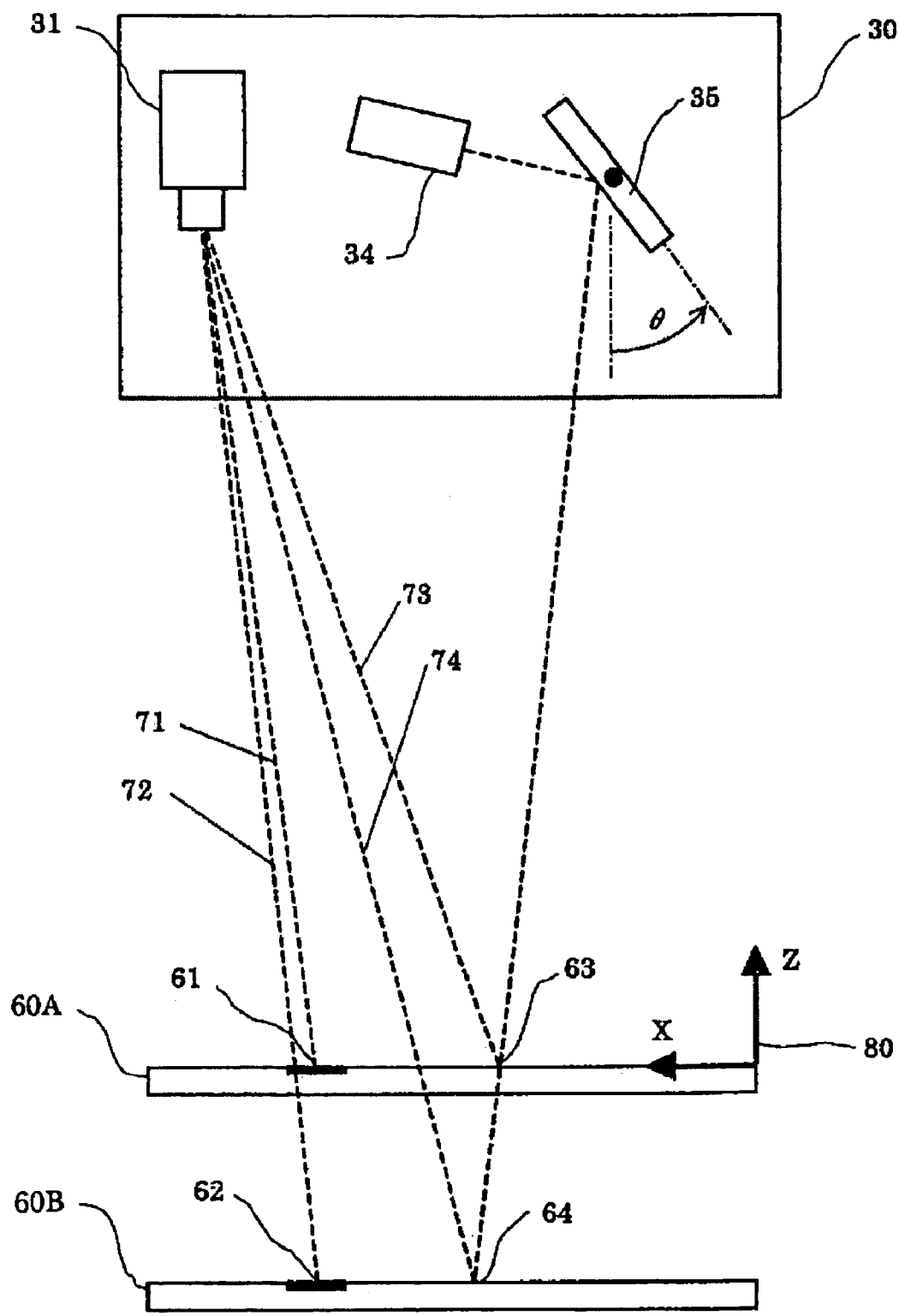
FIG. 3 illustrates details of the calibration.

In FIG. 3, reference signs 60A and 60B denote the measurement target (51 in FIG. 2) positioned in the respective set positions.

In the following, the signs 60A and 60B are used to indicate not only the measurement target but the respective set positions. Namely, 60A and 60B represent the measurement targets (though single in number) set in the respective positions shown in FIG. 3. Similarly, reference signs 61 and 62 are used to represent the positions which the dot pattern (52 in FIG. 2) assumes when the measurement target is set in the respective positions shown in FIG. 3.

As already mentioned, when the measurement target is placed in each of the set positions by means of the calibration jig 50, each dot of the dot pattern 61, 62 printed thereon is located at the known position. For example, where a coordinate system 80 is defined, as shown in the figure, with respect to the measurement target 60A as a sensor measurement reference coordinate system (hereinafter referred to as sensor coordinate system), the positions of the dot patterns 61 and 62 can be expressed as follows:

Position of Dot Pattern 61=(Xa1, Ya1, Za1)

Position of Dot Pattern 62=(Xb1, Yb1, Zb1)

where, in the illustrated example, Za1=0.

If the number of dots of the dot pattern on the measurement target is N and the dots are labeled 1 to N, respectively, then the positions of the individual dots can generally be expressed as follows:

Position of i-th Dot of Dot Pattern 61=(Xai, Yai, Zai)

Position of i-th Dot of Dot Pattern 62=(Xbi, Ybi, Zbi)

where i=1, 2, . . . , N, and in the illustrated example, Za1=Za2= . . . =ZaN=0.

Then, the measurement target 60A, 60B set in the corresponding position is imaged according to the normal imaging using the camera 31, whereupon an image of the measurement target is formed on the image plane on the extension of a line of sight 71, 72. Image coordinates (whose vertical and horizontal axes are referred to as Vt and Hz axes, respectively) of the individual dot patterns 61 and 62 on the images can be expressed as follows:

(Vai, Hai)

(Vbi, Hbi) (where i=1, 2, . . . , N)

(Vai, Hai) can be regarded as a kind of feature amount detected with respect to the dot pattern 61, and (Vbi, Hbi) can be regarded as a kind of feature amount detected with respect to the dot pattern 62.

Since the position of each dot on the sensor coordinate system 80 is known as mentioned above, a calibration calculation technique known in the art is applied to the combination of the feature amounts, whereby, for a given optional image feature amount (V, H), an intersection point (Xa, Ya, Za) where the line of sight determined by the image feature amount intersects with the measurement target 60A and an intersection point (Xb, Yb, Zb) where the line of sight intersects with the measurement target 60B can be calculated.

The equations for calculating the intersection points on the measurement targets 60A and 60B are expressed simply by the following set of expressions (1):

$$(V, H) \rightarrow (Xa, Ya, Za)$$

$$(V, H) \rightarrow (Xb, Yb, Zb) \qquad (1)$$

Once the two intersection points (Xa, Ya, Za) and (Xb, Yb, Zb) are obtained, the equation of a straight line passing through these two points can be derived by a simple calculation. The equation representing the straight line is a "line-of-sight equation", which is expressed simply by the following expression (2):

$$(Xa, Ya, Za), (Xb, Yb, Zb) \rightarrow \text{"Line-of-sight Equation"} \quad (2)$$

Subsequently, a brilliant point 63, 64 of the laser beam irradiated with the mirror 35 directed at a desired angle θ is imaged by the camera 31, whereupon an image of the brilliant point is formed on the image plane on the extension of a line of sight 73, 74. The brilliant points 63 and 64 are obtained as three-dimensional positions on the coordinate system 80 by using the relationship of the above expressions (1).

In cases where the laser beam is a slit beam, two straight brilliant lines are formed on the respective measurement targets, in place of the brilliant points 63 and 64. Then, with respect to each brilliant line (straight line) on the measurement target, three-dimensional positions of a plurality of brilliant points are calculated, whereby a plane (hereinafter referred to as laser slit beam plane) which contains the laser slit beam forming the two brilliant lines can be uniquely determined.

Similarly, with the angle θ of the mirror 35 changed to different angles, the laser slit beam plane at each angle is obtained, whereby the laser slit beam plane corresponding to a desired θ can be calculated. The equation for calculating the laser slit beam plane is expressed simply by the following expression (3):

$$\theta \rightarrow \text{"Equation of Laser Slit Beam Plane"} \quad (3)$$

Thus, the equations (1) to (3) are derived, whereupon the calibration is completed. Specifically, the contents of calculations of the individual equations (1) to (3) (e.g., polynomials) and a plurality of specified parameters (e.g., coefficients and constants of individual terms of the polynomials) are stored in the memory of the visual sensor.

The aforementioned calibration method is carried out with the measurement target set at two positions. The calibration may alternatively be performed with the measurement target set at a single position. An example of such calibration will be briefly explained below. In the following, the measurement target 60A shown in FIG. 3 is assumed to be the "measurement target set at a single position" and the coordinate system 80 defined on the measurement target 60A is referred to as "measurement target coordinate system".

If the pixel size of the camera 31 and the focal distance of the lens used in the camera 31 are already known, then the imaging plane can be assumed to be located at a position spaced at the focal distance from the center point of the lens of the camera. When an optional image feature amount (V, H) is given, a coordinate system (three-dimensional coordinate system whose XY plane coincides with the imaging plane; hereinafter referred to as imaging plane coordinate system) is defined with respect to the imaging plane of the camera, whereby the position (Xc, Yc, Zc) of the object image can be determined. Namely, with respect to the pattern of N dots on the measurement target, the following combination Image Feature amount: (Vai, Hai)
Object Image Position on Imaging Plane Coordinate System: (Xci, Yci, Zci)
Object Position on Measurement Target Coordinate System: (Xai, Yai, Zai) (where i=1, 2, . . . , N)

is obtained. Calibration calculation is then performed on the combination, whereby relative positional relation between the camera imaging plane coordinate system and the measurement target coordinate system is obtained. Consequently, when an optional image feature amount (V, H) is given, the object image position (Xc, Yc, Zc) on the imaging plane coordinate system and the intersection point (Xa, Ya, Za) where the line of sight intersects with the measurement target 60A can be calculated.

The equations for calculating these values are expressed simply by the following set of expressions (1'):

$$(V, H) \rightarrow (Xc, Yc, Zc)$$

$$(V, H) \rightarrow (Xa, Ya, Za) \quad (1')$$

Once the two points (Xc, Yc, Zc) and (Xa, Ya, Za) are obtained, the line-of-sight equation can be obtained by a simple calculation.

The calculation equation is expressed simply by the following expression (2'):

$$(Xc, Yc, Zc), (Xa, Ya, Za) \rightarrow \text{"Line-of-sight Equation"} \quad (2')$$

Subsequently, as in the case of the aforementioned "two-position setting", the brilliant point 63 of the laser beam irradiated with the mirror 35 directed at a desired angle θ is imaged by the camera 31, whereupon an image of the brilliant point is formed on the image plane on the extension of the line of sight 73. The brilliant point 63 is obtained as a three-dimensional position on the measurement target coordinate system 80 by using the relationship of the above expressions (1').

In cases where the laser beam is a slit beam, a straight brilliant line is formed on the measurement target 60A, in place of the brilliant point 63. Where the laser beam emitter 34 is a point light source, the point light source and a straight line (brilliant line) represented by the brilliant point 63 form one plane. Thus, the angle θ of the mirror 35 is changed successively to different angles each by δθ (small angle) and the plane derived at each angle is correlated with the corresponding relative angle varied by δθ, whereby the position of the point light source can be obtained. Consequently, for a given optional angle θ, the laser slit beam plane for that angle can be calculated.

The calculation equation is expressed simply by the following expression (3'):

$$\theta \rightarrow \text{"Equation of Laser Slit Beam Plane"} \quad (3')$$

Thus, the equations (1') to (3') are derived, whereupon the calibration by the "single-position setting" method is completed. Specifically, the contents of calculations of the individual equations (1') to (3') (e.g., polynomials) and a plurality of specified parameters (e.g., coefficients and constants of individual terms of the polynomials) are stored in the memory of the visual sensor, as in the case of the "two-position setting".

Using the three-dimensional visual sensor which has been calibrated by the "one-position setting" or "two-position setting" method as described above, an object is measured in the following manner. First, based on the angle θ of the mirror during the measurement, the laser slit beam plane for that angle is obtained according to the equation (3) or (3'), and then based on the image feature amount (V, H) indicative of the brilliant point of the laser beam, the line of sight from the camera 31 to the brilliant point is derived according to the equations (1) and (2) or the equations (1') and (2'). Subsequently, the equation of laser slit beam plane and the line-of-sight equation are simultaneously solved, thereby obtaining the three-dimensional position of the brilliant point.

The three-dimensional visual sensor, which is now capable of normal measurement, is detached from the jig 50 and then is arranged on the robot arm or at a fixed position external to the robot, depending on the application. The following describes exemplary cases of "arrangement 1" and "arrangement 2" wherein, for convenience' sake, reference numeral 103 is used to denote the measurement target (51, 60A, 60B) explained above in connection with the calibration.

Figure 4:
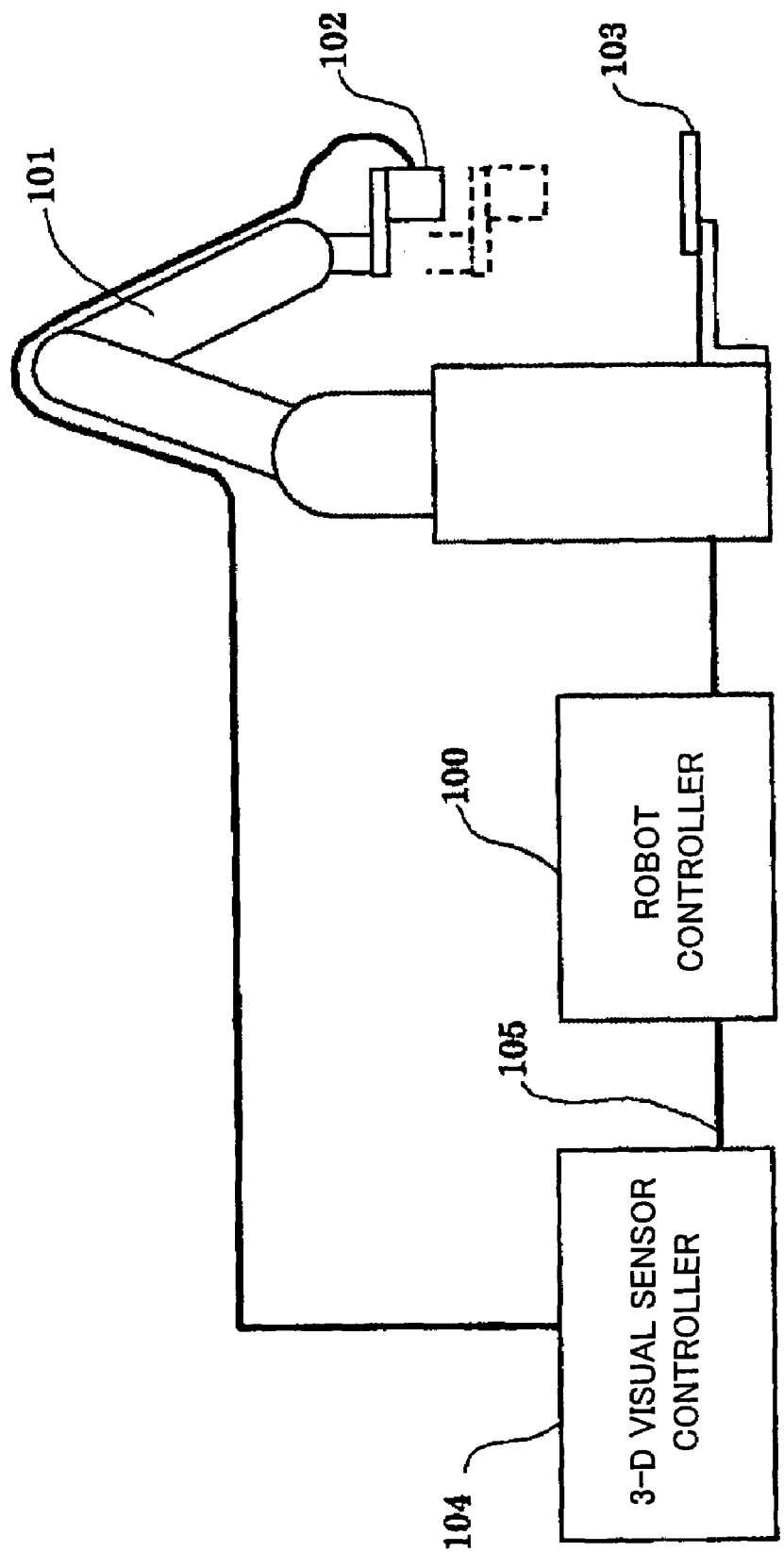
FIG. 4 illustrates an arrangement 1 according to the embodiment.

Arrangement 1: As shown in FIG. 4, a sensor head 102 (identical with the one shown in FIG. 1, as is the case with other elements) is mounted on the arm of a robot 101 while the measurement target 103 is fixed at a suitable position (close to the robot 101 but free from interference). In the illustrated example, the measurement target 103 is fixed to the base of the robot by a fixing member.

The robot 101 is connected to a robot controller 100, and a three-dimensional visual sensor controller 104 is connected with the sensor head 102. The robot controller 100 and the three-dimensional visual sensor controller 104 are connected to each other by, for example, a communication line 105.

Figure 5:
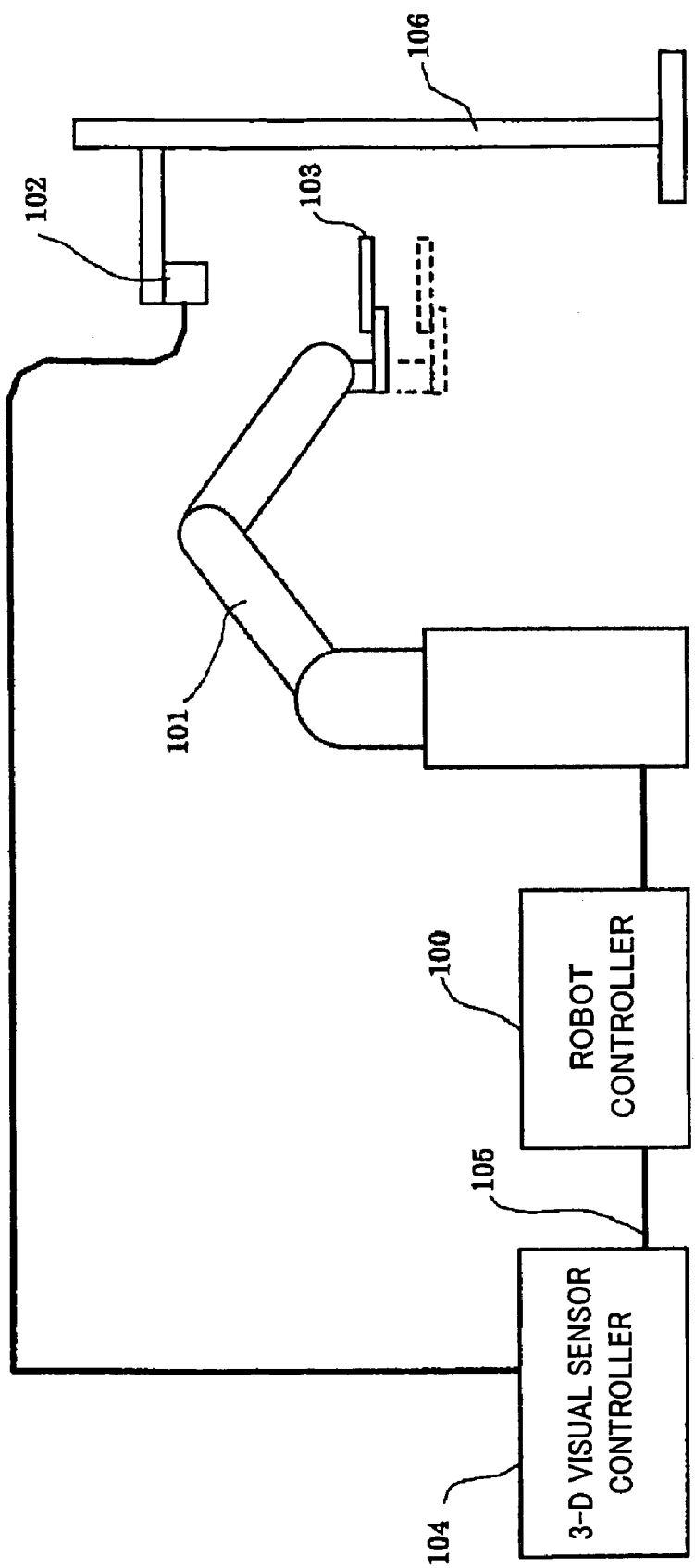
FIG. 5 illustrates an arrangement 2 according to the embodiment.

Arrangement 2: As shown in FIG. 5, the sensor head 102 is arranged at a fixed position external to the robot 101 (in the illustrated example, a fixed position on a support 106). The measurement target 103 is attached to the arm of the robot 101.

Like the arrangement 1, the robot 101 is connected to the robot controller 100, and the three-dimensional visual sensor controller 104 is connected with the sensor head 102. Also, the robot controller 100 and the three-dimensional visual sensor controller 104 are connected to each other by the communication line 105, for example.

Figure 6:
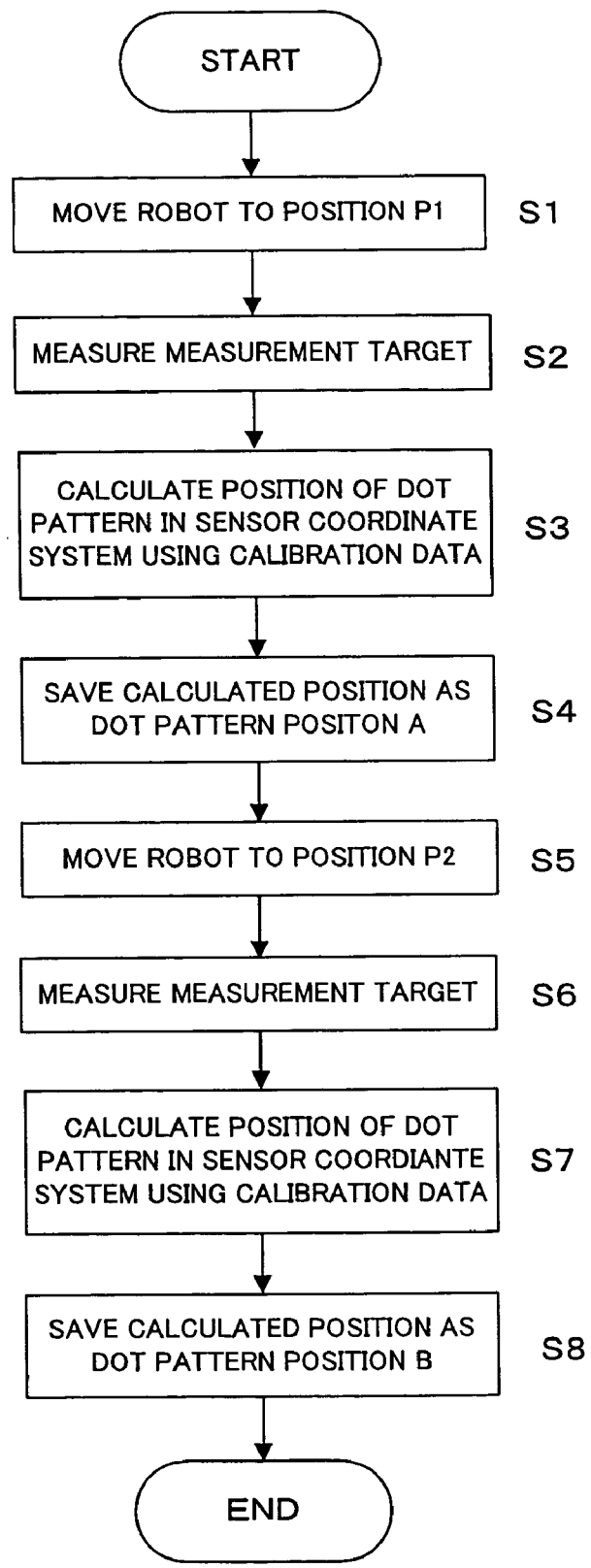
FIG. 6 illustrates a position data acquisition step of the embodiment.

Whichever arrangement is adopted, while the visual sensor 102 is capable of normal measurement, a series of processes, which includes moving the robot arm to two different optional positions P1 and P2 previously set with respect to the robot 101, measuring the measurement target 103 and storing data on the dot pattern, is executed for future re-calibration. FIG. 6 is a flowchart summarizing the series of processes. In the following, the individual steps will be explained.

Step S1: The robot is moved to the position P1, whereby the visual sensor 102 and the measurement target 103 are arranged in a "first relative positional relation".

Step S2: A command (including a position data acquisition command) for causing the visual sensor 102 to measure the measurement target 103 is output to the three-dimensional visual sensor controller 104 by means of manual operation of the keyboard of the robot controller 100, a programmed instruction, etc.

Step S3: The dot pattern position in the sensor coordinate system (or measurement target coordinate system) 80 is calculated. In this case, the calibration parameters saved at the time of the aforementioned calibration are used. It should be noted here that the sensor coordinate system (or measurement target coordinate system) 80 is not necessarily limited to the one established on one measurement target, unlike the case illustrated in FIG. 3.

Step S4: The data obtained in Step S3 is stored in the nonvolatile memory 14 of the visual sensor as "dot pattern position A".

Step S5: The robot is moved to the position P2, whereby the visual sensor 102 and the measurement target 103 are arranged in a "second relative positional relation".

Step S6: A command (including a position data acquisition command) for causing the visual sensor 102 to measure the measurement target 103 is output to the three-dimensional visual sensor controller 104 by means of manual operation of the keyboard of the robot controller 100, a programmed instruction, etc.

Step S7: The dot pattern position in the sensor coordinate system (or measurement target coordinate system) 80 is calculated again. In this case, the calibration parameters saved at the time of the aforementioned calibration are used. It should also be noted here that the sensor coordinate system (or measurement target coordinate system) 80 is not necessarily limited to the one established on one measurement target, unlike the case illustrated in FIG. 3.

Step S8: The data obtained in Step S7 is stored in the nonvolatile memory 14 of the visual sensor as "dot pattern position B".

Figure 7:
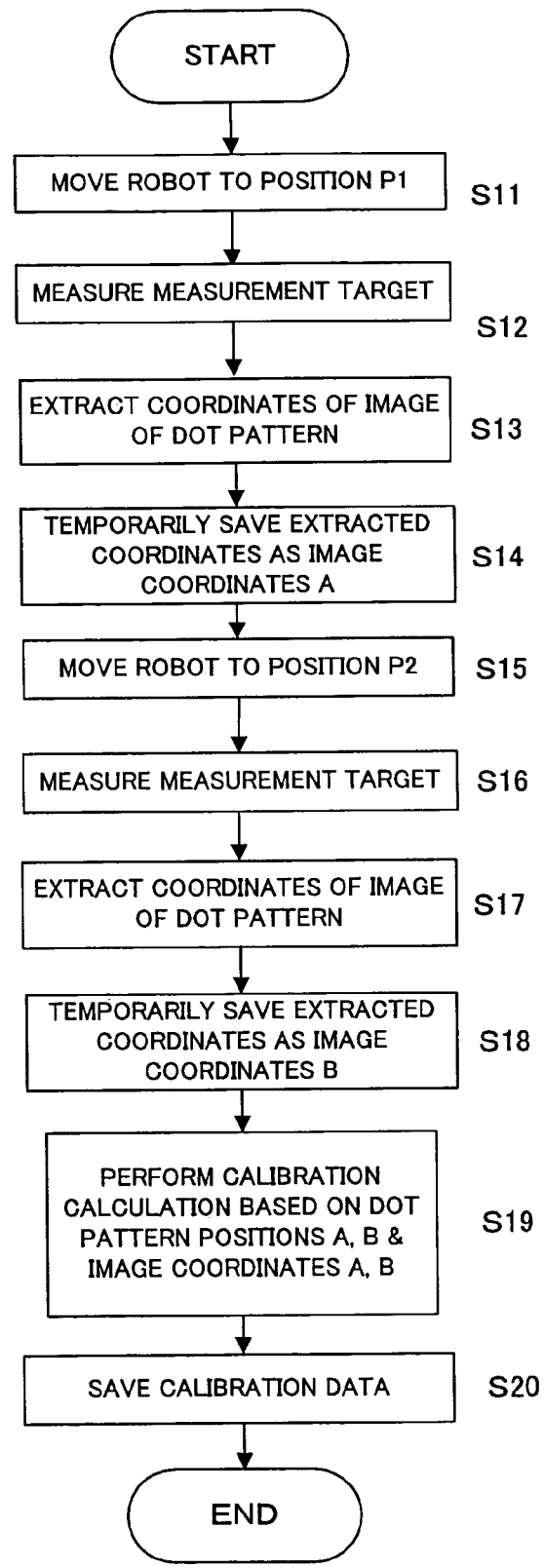
FIG. 7 illustrates a re-calibration step of the embodiment.

The above completes the preparatory process (position data acquisition step) for re-calibration. If re-calibration of the visual sensor 102 is required thereafter due to the various causes mentioned in the BACKGROUND OF THE INVENTION section, a re-calibration step is executed. FIG. 7 is a flowchart summarizing the re-calibration, and in the following, the individual steps will be explained.

Step S11: The robot is moved to the position P1. Consequently, the "first relative positional relation" between the visual sensor 102 and the measurement target 103 is reproduced at least approximately. (Generally, the position/orientation of the visual sensor may presumably have changed, and thus the reproduced relation involves corresponding inaccuracy.)

Step S12: A command (including a re-calibration command) for causing the visual sensor 102 to measure the measurement target 103 is output to the three-dimensional visual sensor controller 104 by means of manual operation of the keyboard of the robot controller 100, a programmed instruction, etc.

Step S13: Image coordinates of the dot pattern on the measurement target 103 are extracted.

Step S14: The image coordinates extracted in Step S13 are temporarily saved in the nonvolatile memory 14 of the visual sensor as image coordinates A.

Step S15: The robot is moved to the position P2. Consequently, the "second relative positional relation" between the visual sensor 102 and the measurement target 103 is reproduced at least approximately. (Also in this case, generally, the position/orientation of the visual sensor may presumably have changed, and thus the reproduced relation involves corresponding inaccuracy.)

Step S16: A command (including a re-calibration command) for causing the visual sensor 102 to measure the measurement target 103 is output to the three-dimensional visual sensor controller 104 by means of manual operation of the keyboard of the robot controller 100, a programmed instruction, etc.

Step S17: Image coordinates of the dot pattern on the measurement target 103 are extracted.

Step S18: The image coordinates extracted in Step S17 are temporarily saved in the nonvolatile memory 14 of the visual sensor as image coordinates B.

Step S19: Using the data "dot pattern position A", "dot pattern position B", "image coordinates A" and "image coordinates B", calibration calculation for the re-calibration is performed. Namely, the aforementioned equations (1) and (2) or the equations (1') and (2') can be updated (recalculated and stored) by using these items of data. Also, by performing the aforementioned laser beam calibration, it is possible to update (recalculate and store) the equation (3) or (3'). This completes the re-calibration.

Step S20: The calibration parameters obtained in Step S19 are saved in the memory of the visual sensor, in place of the previous calibration parameters, whereupon the process ends.

In the above description of the embodiment, the three-dimensional visual sensor and the measurement target are brought into two relative positional relations by the robot. Where the aforementioned calibration method in which the measurement target is set in a single position is employed, however, only one relative positional relation needs to be determined.

Also, as a modification of the arrangement 1 or 2, the measurement target 103 may be arranged on the arm of a different robot so as to establish each of the relative positional relations and to reproduce the relations at least approximately. For example, the measurement target may be attached to the arm of a "different robot", and the position P3 may be used as a substitute for the aforementioned "fixed position".

Further, in the above description of the embodiment, the measurement target is measured by the three-dimensional visual sensor at the time of acquiring reference data and at the time of re-calibration, to obtain "position" data of the measurement target. More specifically, in Steps S3 and S4 of the flowchart of FIG. 6, the dot pattern position of the measurement target with reference to the sensor coordinate system is detected and saved as the dot pattern position A, and in Steps S7 and S8, the dot postern position of the measurement target with reference to the sensor coordinate system is detected and saved as the dot pattern position B (reference data acquisition). Then, in Steps S13, S14, S17 and S18 of the flowchart of FIG. 7, the extraction of image coordinates of the dot pattern on the measurement target and the temporary storage of the extracted image coordinates A and B are performed in like manner (data acquisition for re-calibration).

The present invention can be equally carried out by acquiring "orientation" data of the measurement target, instead of the "position" data of same. The reason will be briefly explained below. The following explanation is directed to the dot pattern position A only, because the dot pattern positions A and B of the above embodiment, though described separately, are obtained with the same measurement target set in different positions relative to the three-dimensional visual sensor, as already explained.

Figure 8:
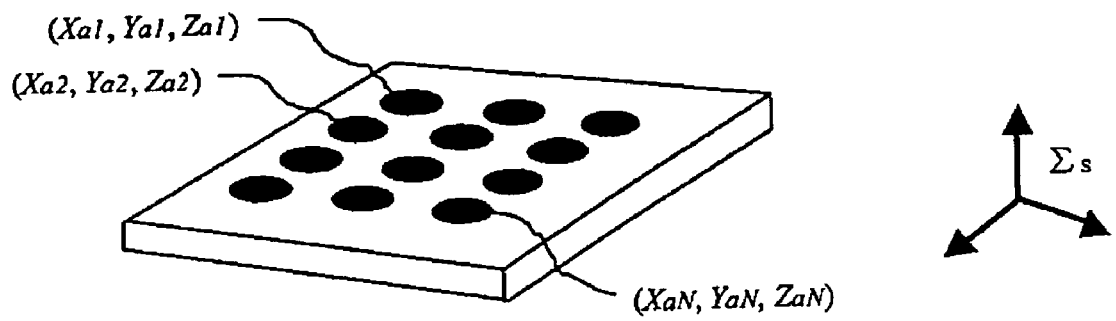
FIG. 8 shows, by way of example, a dot pattern constituted by a matrix of N dots (N=12), wherein the coordinates of first and last dots are $(Xa1, Ya1, Za1)$ and $(XaN, YaN, ZaN)$, respectively.

The manner of storing the dot pattern position A according to the foregoing embodiment exemplifies one method of measuring the measurement target and storing the position information relating thereto. In accordance with the expression used in this specification, the position data (Xai, Yai, Zai) (where i=1, 2, . . . , N) is stored. Provided the sensor coordinate system is expressed by $\Sigma s$, (Xai, Yai, Zai) represents coordinates in $\Sigma s$. FIG. 8 shows an example of a dot pattern constituted by a matrix of N dots (N=12) and indicates that the coordinates of first and last dots are (Xa1, Ya1, Za1) and (XaN, YaN, ZaN), respectively.

Figure 9:
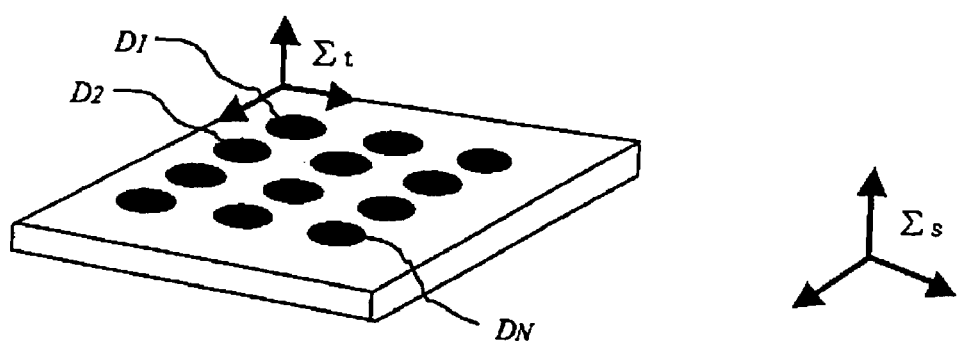
FIG. 9 is a diagram explaining that the positions of the individual dots of the dot pattern can be calculated from the combination of information on the arrangement of the dot pattern and information on the position/orientation of a measurement target.

As another method of measuring the measurement target and storing the position information relating thereto, "orientation" of the measurement target may be stored by the method described below. If the arrangement of the dot pattern on the measurement target is already known, information equivalent to that obtained by measuring the positions of the individual dots of the dot pattern can be derived by measuring the position/orientation of the measurement target. Namely, if information on the arrangement of the dot pattern is prepared in advance, the positions of the individual dots of the dot pattern can be calculated immediately by using the arrangement information in combination with information on the position/orientation of the measurement target. This will be explained with reference to FIG. 9.

In the following, a coordinate system fixedly established on the measurement target is referred to as $\Sigma t$. Assuming that the arrangement of the dot pattern on the measurement target is already known, the arrangement of the individual dots is expressed by Di (where i=1, 2, . . . , N)

where Di indicates coordinates in the coordinate system $\Sigma t$. More specifically, the arrangement of the individual dots is expressed by Di=(xi, yi, zi) (where i=1, 2, . . . , N)

The measurement target is then measured and the position information relating thereto is stored as $\Sigma t$ position/orientation (hereinafter expressed by T) as viewed from the sensor coordinate system $\Sigma s$. As is known in the art, T is a homogeneous transformation matrix. Thus, if Di is previously known, positions (coordinates) on the sensor coordinate system $\Sigma s$ can be converted to those on the coordinate system $\Sigma t$ and vice versa by using the equation (4) below. Storing the position/orientation T of the measurement target is therefore equivalent to storing (Xai, Yai, Zai).

$$\begin{pmatrix} Xai \\ Yai \\ Zai \end{pmatrix} = T \cdot Di = T \cdot \begin{pmatrix} xi \\ yi \\ zi \end{pmatrix} = \begin{pmatrix} a11 & a12 & a13 & a14 \\ a21 & a22 & a23 & a24 \\ a31 & a32 & a33 & a34 \\ 0 & 0 & 0 & 1 \end{pmatrix} \cdot \begin{pmatrix} xi \\ yi \\ zi \end{pmatrix} \quad (4)$$

Figure 10:
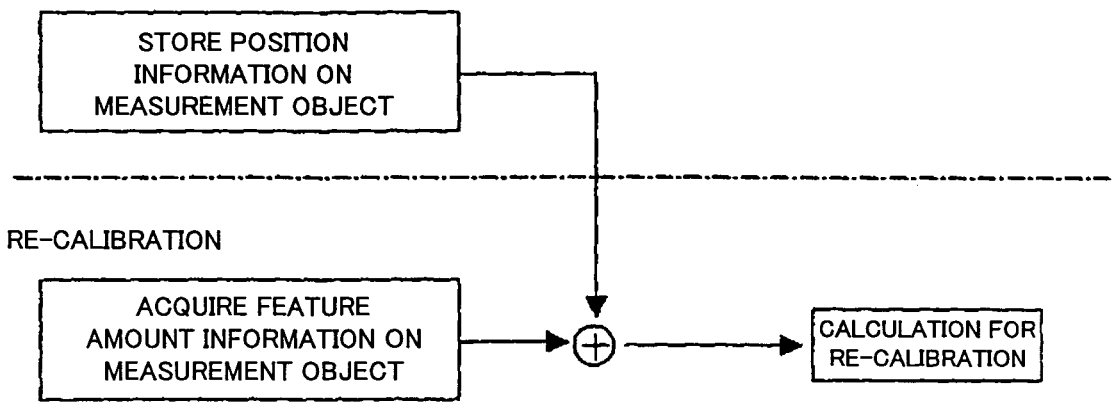
FIG. 10 is a diagram summarizing the relationship of processes explained with reference to the embodiment.
Figure 11:
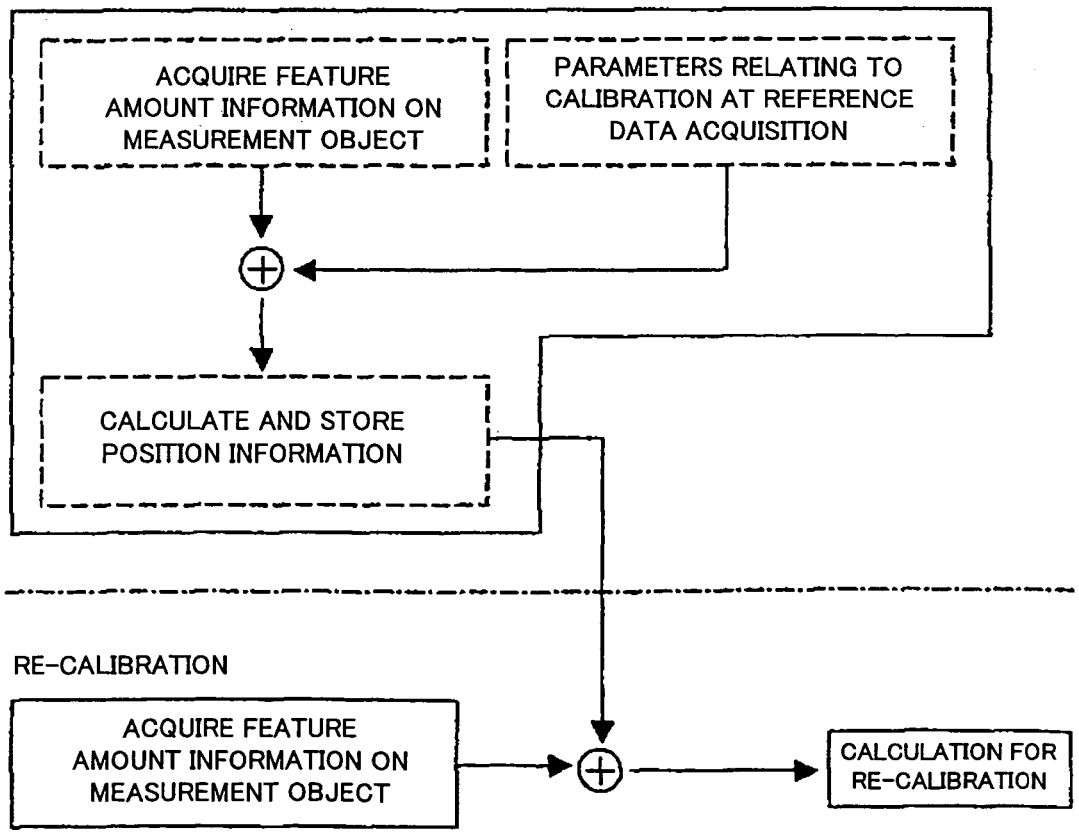
FIG. 11 is a diagram illustrating a modification of the relationship shown in FIG. 10.

The processes explained above with reference to the embodiment can be summarized as shown in the relationship diagram of FIG. 10. In the figure, "measurement object" is used as a more generic term for the "measurement target" referred to in the foregoing description of the embodiment. According to the present invention, it is also possible to modify the illustrated relationship. In the relationship diagram of FIG. 10, the position information on the measurement object (measurement target) is calculated from the feature amount information on the measurement object (measurement target) and the parameters relating to calibration of the three-dimensional visual sensor already held by the same sensor (as data before updating). Accordingly, the relationship shown in FIG. 10 can be rewritten as shown in FIG. 11.

Here let us consider the timing of acquiring the position information. In the above embodiment (FIG. 10), the position information (position/orientation data) is acquired at the time of acquiring the reference data, but it will be understood that essentially the feature amount information on the measurement object (measurement target) has only to be acquired at that timing.

Figure 12:
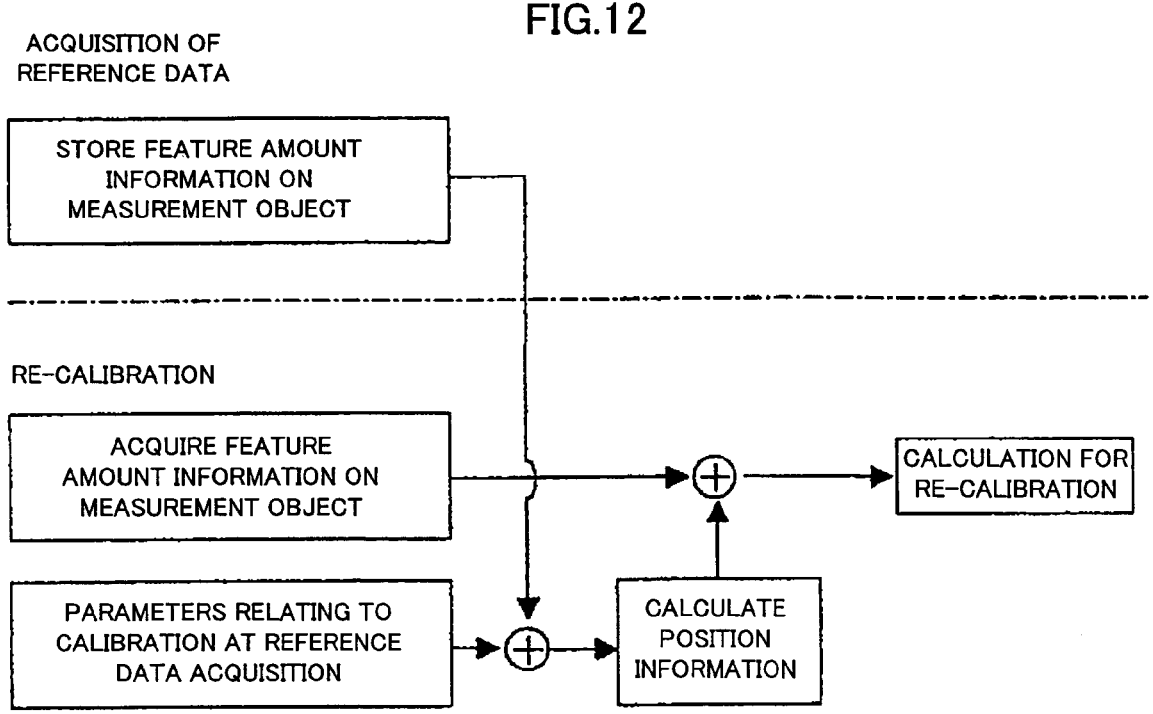
FIG. 12 is a diagram summarizing the relationship of processes which are modifications of the processes explained with reference to the embodiment of the present invention.

In view of this, the relationship of processes shown in FIG. 12 may be adopted in place of the relationship shown in FIG. 10. Namely, to acquire the reference data, the three-dimensional visual sensor and the measurement target (measurement object) are arranged in at least one optional relative positional relation while the three-dimensional visual sensor is in a state capable of normal measurement, and then the measurement target (measurement object) is measured by the three-dimensional visual sensor to acquire feature amount data on the measurement target (measurement object), the acquired feature amount data being stored.

Then, at the time of re-calibrating the three-dimensional visual sensor after the three-dimensional visual sensor was in the state capable of normal measurement, the three-dimensional visual sensor and the measurement target (measurement object) are arranged so that the at least one relative positional relation may be reproduced at least approximately, and then the measurement target (measurement object) is measured by the three-dimensional visual sensor to acquire feature amount data on the measurement target (measurement object).

Subsequently, based on the parameters relating to calibration obtained while the three-dimensional visual sensor was in the state capable of normal measurement, the feature amount data obtained at the time of the reference data acquisition and the feature amount data obtained at the time of the re-calibration data acquisition, the parameters relating to calibration of the three-dimensional sensor are updated.

Like the foregoing embodiment, arranging the three-dimensional visual sensor and the measurement object in the at least one relative positional relation at the time of the reference data acquisition and arranging the same elements so as to reproduce the at least one relative positional relation at least approximately at the time of the re-calibration are carried out by moving the robot which supports at least one of the three-dimensional visual sensor and the measurement object. Also, to reproduce the at least one relative positional relation at least approximately at the time of the re-calibration, the robot is moved to reproduce the robot position where the at least one relative positional relation was established at the time of the reference data acquisition.

Further, instead of defining the two relative positional relations between the three-dimensional visual sensor and the measurement target by means of the robot, the method wherein calibration is performed with the measurement target set in a single position may be employed as mentioned above, in which case only one relative positional relation may be defined. Moreover, the method may be employed wherein the measurement target 103 is arranged on the arm of a different robot to establish the at least one relative positional relation and to reproduce the at least one relative positional relation at least approximately.

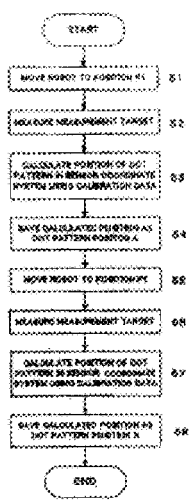

What is claimed is:

1. A method of re-calibrating a three-dimensional visual sensor holding a plurality of parameters relating to calibration in a robot system, said method comprising the steps of:
   (a) moving a robot which supports at least one of the three-dimensional visual sensor and a measurement target to a calibration position to place the three-dimensional visual sensor and the measurement target in at least one optional relative positional relation while the three-dimensional visual sensor is in a state capable of normal measurement, measuring the measurement target by the three-dimensional visual sensor to acquire position/orientation data indicative of at least one of position and orientation of the measurement target with reference to a sensor coordinate system by using the parameters relating to calibration then held by the three-dimensional visual sensor, and storing the position/orientation data;
   (b) moving the robot to the calibration position of step (a) to place the three-dimensional visual sensor and the measurement target so as to reproduce the at least one relative positional relation at least approximately when the three-dimensional visual sensor is to be recalibrated after the three-dimensional visual sensor was in said state, and then measuring the measurement target by the three-dimensional visual sensor to acquire feature amount data on the measurement target with reference to an imaging plane coordinate system of the three-dimensional visual sensor; and
   (c) updating the parameters relating to calibration of the three-dimensional visual sensor, based on the feature amount data and the position/orientation data.

2. A method of re-calibrating a three-dimensional visual sensor according to claim 1, wherein one of the three-dimensional visual sensor and the measurement target is mounted on an arm of the robot while the other is placed at a predetermined position other than the arm of the robot, so as to be arranged in the at least one relative positional relation in said step (a), and to reproduce the at least one relative positional relation at least approximately in said step (b).

3. A method of re-calibrating a three-dimensional visual sensor according to claim 1, wherein the three-dimensional visual sensor is mounted on an arm of the robot and the measurement target is placed at a position different from the arm of the robot, so as to be arranged in the at least one relative positional relation in said step (a), and to reproduce the at least one relative positional relation at least approximately in said step (b).

4. A method of re-calibrating a three-dimensional visual sensor according to claim 1, wherein the three-dimensional visual sensor is mounted on an arm of the robot and the measurement target is placed on an arm of a different robot, so as to be arranged in the at least one relative positional relation in said step (a), and to reproduce the at least one relative positional relation at least approximately in said step (b).

5. A method of re-calibrating a three-dimensional visual sensor holding a plurality of parameters relating to calibration in a robot system, said method comprising the steps of:
   (a) moving a robot which supports at least one of the three-dimensional visual sensor and a measurement target to a calibration position to place the three-dimensional visual sensor and the measurement target in at least one optional relative positional relation while the three-dimensional visual sensor is in a state capable of normal measurement, then measuring the measurement target by the three-dimensional visual sensor to acquire feature amount data on the measurement target with reference to a sensor coordinate system, and storing the feature amount data;
   (b) moving the robot to the calibration position of step (a) to place the three-dimensional visual sensor and the measurement target so as to reproduce the at least one relative positional relation at least approximately when the three-dimensional visual sensor is to be recalibrated after the three-dimensional visual sensor was in said state, and then measuring the measurement target by the three-dimensional visual sensor to acquire feature amount data on the measurement target with reference to an imaging plane coordinate system of the three-dimensional sensor; and
   (c) updating the parameters relating to calibration of the three-dimensional visual sensor, based on the parameters relating to calibration of the three-dimensional visual sensor held at the time of said step (a), the feature amount data acquired in said step (a), and the feature amount data acquired in said step (b).

6. A method of re-calibrating a three-dimensional visual sensor according to claim 5, wherein one of the three-dimensional visual sensor and the measurement target is mounted on an arm of the robot while the other is placed at a predetermined position other than the arm of the robot, so as to be arranged in the at least one relative positional relation in said step (a), and to reproduce the at least one relative positional relation at least approximately in said step (b).

7. A method of re-calibrating a three-dimensional visual sensor according to claim 5, wherein the three-dimensional visual sensor is mounted on an arm of the robot and the measurement target is placed at a position different from the arm of the robot, so as to be arranged in the at least one relative positional relation in said step (a), and to reproduce the at least one relative positional relation at least approximately in said step (b).

8. A method of re-calibrating a three-dimensional visual sensor according to claim 5, wherein the three-dimensional visual sensor is mounted on an arm of the robot and the measurement target is placed on an arm of a different robot, so as to be arranged in the at least one relative positional relation in said step (a), and to reproduce the at least one relative positional relation at least approximately in said step (b).

9. A device for re-calibrating a three-dimensional visual sensor mounted on an arm of a robot, comprising:
    means for holding a plurality of parameters relating to calibration of the three-dimensional visual sensor;
    means for moving the robot to at least one robot calibration position where the three-dimensional visual sensor is located close to a measurement target to arrange the three-dimensional visual sensor and the measurement target in at least one relative positional relation;
    target position information detection means for detecting position information on the measurement target in the at least one robot calibration position, through measurement by the three-dimensional visual sensor;
    target feature-amount information detection means for detecting feature-amount information on the measurement target in the at least one robot position, through measurement by the three-dimensional visual sensor;
    means, responsive to a reference data acquisition command, for causing the target position information detection means to detect position information on the measurement target at the calibration position with reference to a sensor coordinate system, and storing the detected position information as position/orientation data indicative of at least one of position and orientation of the measurement target with reference to the sensor coordinate system by using the held parameters relating to calibration of the three-dimensional visual sensor;
    means, responsive to a re-calibration command, for causing the target feature amount information detection means to detect feature amount information on the measurement target with reference to an imaging plane coordinate system of the three-dimensional visual sensor in the calibration position used to place the three-dimensional visual sensor and the measurement target so as to reproduce the at least one relative positional relation at least approximately, and obtaining the detected feature amount information as feature amount data; and
    parameter updating means for updating the parameters relating to calibration of the three-dimensional visual sensor, based on the feature amount data and the position/orientation data.

10. A device for re-calibrating a three-dimensional visual sensor using a measurement target mounted on a robot, comprising:
    means for holding a plurality of parameters relating to calibration of the three-dimensional visual sensor;
    means for moving the robot to at least one robot calibration position where the measurement target is located close to the three-dimensional visual sensor to arrange the three-dimensional visual sensor and the measurement target in at least one relative positional relation;
    target position information detection means for detecting position information on the measurement target in the at least one robot calibration position, through measurement by the three-dimensional visual sensor;
    target feature amount information detection means for detecting feature amount information on the measurement target in the at least one robot position, through measurement by the three-dimensional visual sensor;
    means, responsive to a reference data acquisition command, for causing the target position information detection means to detect position information on the measurement target at the calibration position with reference to a sensor coordinate system, and storing the detected position information as position/orientation data indicative of at least one of position and orientation of the measurement target with reference to the sensor coordinate system by using the held parameters relating to calibration of the three-dimensional visual sensor;
    means, responsive to a re-calibration command, for causing the target feature amount information detection means to detect feature amount information on the measurement target with reference to an imaging plane coordinate system of the three-dimensional visual sensor in a calibration position used to place the three-dimensional visual sensor and the measurement target so as to reproduce the at least one relative positional relation at least approximately, and obtaining the detected feature amount information as feature amount data; and
    parameter updating means for updating the parameters relating to calibration of the three-dimensional visual sensor, based on the feature amount data and the position/orientation data.

11. A device for re-calibrating a three-dimensional visual sensor mounted on an arm of a robot, comprising:
    means for holding a plurality of parameters relating to calibration of the three-dimensional visual sensor;
    means for moving the robot to at least one robot calibration position where the three-dimensional visual sensor is located close to a measurement target to arrange the three-dimensional visual sensor and the measurement target in at least one relative positional relation;
    target feature amount information detection means for detecting feature amount information on the measurement target in the at least one robot calibration position, through measurement by the three-dimensional visual sensor;
    means, responsive to a reference data acquisition command, for causing the target feature amount information detection means to detect feature amount information on the measurement target at the calibration position with reference to a sensor coordinate system, and storing the detected feature amount information as reference feature amount data;
    means, responsive to a re-calibration command, for causing the target feature amount information detection means to detect feature amount information on the measurement target with reference to an imaging plane coordinate system in the calibration position used to place the three-dimensional visual sensor and the measurement target so as to reproduce the at least one relative positional relation at least approximately, and obtaining the detected feature amount information as feature amount data; and parameter updating means for updating the parameters relating to calibration of the three-dimensional visual sensor, based on the feature amount data, the reference feature amount data, and the parameters relating to calibration of the three-dimensional visual sensor held at the time of reception of the reference data acquisition command.

12. A device for re-calibrating a three-dimensional visual sensor using a measurement target mounted on a robot, comprising:

means for holding a plurality of parameters relating to calibration of the three-dimensional visual sensor;

means for moving the robot to at least one robot calibration position where the measurement target is located close to the three-dimensional visual sensor to arrange the three-dimensional visual sensor and the measurement target in at least one relative positional relation;

target feature amount information detection means for detecting feature amount information on the measurement target in the at least one robot calibration position, through measurement by the three-dimensional visual sensor;

means, responsive to a reference data acquisition command, for causing the target feature amount information detection means to detect feature amount information on the measurement target at the calibration position with reference to a sensor coordinate system, and storing the detected feature amount information as reference feature amount data;

means, responsive to a re-calibration command, for causing the target feature amount information detection means to detect feature amount information on the measurement target with reference to an imaging plane coordinate system of the three-dimensional visual sensor in the calibration position used to place the three-dimensional visual sensor and the measurement target so as to reproduce the at least one relative positional relation at least approximately, and obtaining the detected feature amount information as feature amount data; and parameter updating means for updating the parameters relating to calibration of the three-dimensional visual sensor, based on the feature amount data, the reference feature amount data, and the parameters relating to calibration of the three-dimensional visual sensor held at the time of reception of the reference data acquisition command.

* * * * *

UNITED STATES PATENT AND TRADEMARK OFFICE
CERTIFICATE OF CORRECTION

PATENT NO.       : 7,359,817 B2
APPLICATION NO.  : 11/190946
DATED            : April 15, 2008
INVENTOR(S)      : Kazunori Ban et al.

It is certified that error appears in the above-identified patent and that said Letters Patent is hereby corrected as shown below:

The Title page should be deleted and substitute therefor the attached title page.

Signed and Sealed this

Seventh Day of October, 2008

JON W. DUDAS
*Director of the United States Patent and Trademark Office*

(12) United States Patent
Ban et al.

(10) Patent No.: US 7,359,817 B2
(45) Date of Patent: Apr. 15, 2008

(54) METHOD OF AND DEVICE FOR RE-CALIBRATING THREE-DIMENSIONAL VISUAL SENSOR IN ROBOT SYSTEM

(75) Inventors: Kazunori Ban, Yamanashi (JP); Ichiro Kanno, Yokohama (JP)

(73) Assignee: Fanuc Ltd, Yamanashi (JP)

(*) Notice: Subject to any disclaimer, the term of this patent is extended or adjusted under 35 U.S.C. 154(b) by 133 days.

(21) Appl. No.: 11/190,946

(22) Filed: Jul. 28, 2005

(65) Prior Publication Data
US 2006/0023938 A1 Feb. 2, 2006

(30) Foreign Application Priority Data
Jul. 28, 2004 (JP) ............ 2004-220251

(51) Int. Cl.
G06F 19/00 (2006.01)
G01C 25/00 (2006.01)
G05B 99/00 (2006.01)

(52) U.S. Cl. .......... 702/94; 73/1.75; 73/1.79; 73/1.81; 356/2; 356/3; 356/4.01; 382/100; 382/108; 700/245; 700/254; 700/258; 700/259; 702/85; 702/95; 702/97; 702/105; 702/150; 702/152; 702/155

(58) Field of Classification Search .......... 73/1.75, 73/1.79, 1.81; 356/2, 3, 4.01, 4.02, 4.03, 356/9, 15, 16, 17, 18; 382/100, 106, 108; 700/90, 245, 250, 251, 254, 258, 259; 702/1, 702/85, 86, 90, 94, 95, 97, 105, 127, 150, 702/152, 153, 155, 166, 167
See application file for complete search history.

(56) References Cited

U.S. PATENT DOCUMENTS
2,896,503 A * 7/1959 Stamps .................. 356/2
2,964,644 A * 12/1960 Hobrough ............... 250/558
(Continued)

FOREIGN PATENT DOCUMENTS
DE 10 2004 046 584 A1 * 5/2005
(Continued)

OTHER PUBLICATIONS
Japanese Patent Office Notice of Reasons for Rejection, dated Oct. 24, 2006, and issued in priority Japanese Patent Application No. 2004-220251.
(Continued)

Primary Examiner—Edward R Cosimano
(74) Attorney, Agent, or Firm—Staas & Halsey LLP

(57) ABSTRACT

A re-calibration method and device for a three-dimensional visual sensor of a robot system, whereby the work load required for re-calibration is mitigated. While the visual sensor is normal, the visual sensor and a measurement target are arranged in one or more relative positional relations by a robot, and the target is measured to acquire position/orientation information of a dot pattern etc. by using calibration parameters then held. During re-calibration, each relative positional relation is approximately reproduced, and the target is again measured to acquire feature amount information or position/orientation of the dot pattern etc. on the image. Based on the feature amount data and the position information, the parameters relating to calibration of the visual sensor are updated. At least one of the visual sensor and the target, which are brought into the relative positional relation, is mounted on the robot arm. During the re-calibration, position information may be calculated using the held calibration parameters as well as the feature amount information obtained during normal operation of the visual sensor and that obtained during the re-calibration, and the calibration parameters may be updated based on the calculation results.

12 Claims, 10 Drawing Sheets